United States Patent
McClain et al.

[11] Patent Number: 5,960,629
[45] Date of Patent: Oct. 5, 1999

[54] CONTROL APPARATUS FOR A BRAKE BOOSTER

[75] Inventors: Richard Becker McClain, South Bend; Kenneth Scott Towers, Granger, both of Ind.

[73] Assignee: Robert Bosch Technology Corp, Broadview, Ill.

[21] Appl. No.: 09/015,166

[22] Filed: Jan. 29, 1998

[51] Int. Cl.⁶ .................................................. B60T 13/00
[52] U.S. Cl. ........................ 60/547.2; 60/547.3; 60/581
[58] Field of Search .................. 60/533, 534, 547.2, 60/547.3, 581

[56] References Cited

U.S. PATENT DOCUMENTS

| | | | |
|---|---|---|---|
| 3,050,944 | 8/1962 | Schwartz et al. | 91/431 X |
| 3,845,693 | 11/1974 | Meyers | 91/371 |
| 3,896,620 | 7/1975 | Flory | 60/547.2 |
| 3,967,536 | 7/1976 | Bach | 91/371 |
| 4,311,085 | 1/1982 | Runkle | 60/547.2 X |

*Primary Examiner*—Hoang Nguyen
*Attorney, Agent, or Firm*—Leo H. McCormick, Jr; Warren Comstock

[57] ABSTRACT

A control apparatus (12) in a brake system (10) has a housing (20) with an inlet port (26), a gear port (32), a relief port (38), and an outlet port (42). A piston (44) located in a first bore (22) has a first peripheral surface (50) with first (52) and second (54) grooves separated by a land (56) and a second bore (60) respectively connected to the first (52) and second (54) grooves by first (62) and second (64) radial passages. A spool (68) which has a peripheral surface (74) with a control groove (76) is connected to a third bore (88) therein by a cross bore or passage (86) and retained in the second bore (60) by a snap ring (96). An input rod (92) which is located in the third bore (88) has a shoulder (94) which engages the spool (68) while an end cap (98) that is connected to the housing (20) retains the piston (44), spool (68) and input rod (92) in the housing (20). Resilient (104,97) respectively, positioning the piston (44) within the first bore (22) and the spool (68) within the second bore (60) to assure that pressurized fluid is always communicated by way of the inlet port (26), first groove (52), first radial passage (62), control groove (76), second radial passage (64) and gear port (32) to operate the hydraulically operated device (28). The input rod (92) responds to an input force by moving the spool (68) in bore 22 to restrict communication between the inlet port (26) and gear port (32) and diverting pressurized fluid to the outlet port (42) and supply the brake booster (18) with pressurized fluid to effect a brake application.

11 Claims, 3 Drawing Sheets

CONTROL APPARATUS FOR A BRAKE BOOSTER

This invention relates to a control apparatus for supplying a remotely located brake booster with an input signal where an actuation force is correspondingly developed and supplied to a brake system to effect a brake application.

BACKGROUND OF THE INVENTION

Hydraulic brake boosters have been designed to provide an assist in the actuation of a master cylinder where a brake force is developed to effect a brake application. In order to reduce the cost of a hydraulic brake booster, often the same hydraulic power source used to supply a steering gear is used to power a hydraulic brake booster. The controls for such hydraulic brake boosters are designed such that a minimum amount of hydraulic fluid is always available for operation of either the hydraulic brake booster or the steering gear. In certain brake boosters of the type disclosed in U.S. Pat. Nos. 3,967,536; 4,131,055; 4,179,980; 4,514,981; 4,724,674 and 5,442,916, the booster operate by restricting flow from one side of a power piston to the other side of the power piston to create a fluid pressure differential which causes a power piston to move and provide power assisted displacement of the pistons in a master cylinder. In this type of brake booster, the master cylinder and booster are joined together and as a result the overall length occupies considerable under hood space of a vehicle. However, because of the efficiency of such brake boosters they have found application in many vehicles and in particular van and certain mid-sized trucks. In recent vehicle models the physical design of the under hood space is often restricted or reduced, and consequently locating a brake booster and other components is often a difficult task. To better utilize under hood space, it has been suggested as in U.S. Pat. Nos. 5,329,769 and 5,313,796, that certain brake systems components could be located remotely from under the hood.

SUMMARY OF THE INVENTION

A primary object of the present invention is to provide a brake system with a control apparatus having a remotely located brake booster.

According to this invention, the control apparatus has a housing which is fixed to a fire wall of a vehicle and connected to a brake booster which is positioned at some location outside of the space under the hood of a vehicle. The housing for the control apparatus has a first bore therein which is connected with a source of fluid under pressure, i.e. power steering pump, through an inlet port, with a power steering gear or other hydraulically operated device through a gear port, with a reservoir through a relief port and the brake booster through an outlet port. A piston which has a first peripheral surface with first and second grooves thereon that are separated by lands is located in the first bore. A second bore in the piston is connected to the first and second grooves by first and second radial passages. The piston is designed to accept a spool which has a second peripheral surface thereon with a control groove. The control groove is connected to a third bore in the spool by a third radial passage and to a relief port in the piston. An input rod has a cylindrical body with a portion thereof located in the third bore until a shoulder engages the spool. A cap is secured to the housing for retaining the piston means in the first bore while a first spring positions the piston within the first bore and a second spring positions the spool within the second bore. With the piston and spool in a rest position, pressurized fluid from the pump is freely communicated to the hydraulically operated device by way of the inlet port, first groove, first radial passage, control groove, second radial passage and the gear port. When it is desirous to effect a brake application, an input force is applied to the input rod to move the spool within the second bore and restrict communication between the first and second radial passages in the piston while diverting pressurized fluid through the control groove to the third bore by way of the third passage. A first projection that extends from the piston in sealing engagement with the housing connects the third bore with the outlet port to supply the brake booster with pressurized fluid for effecting a brake application. The first spring allows the piston to move within the first bore to assure that intensity of the pressurized fluid supplied to the brake booster remains at a desired level.

An advantage of this brake systems of this invention resides in a control apparatus which allows the joint use of a source of pressurized fluid for a brake system and a steering gear.

A further advantage of this brake system of this invention is provided by a control apparatus wherein resilient means allow a piston to move within a bore and a spool to move within the piston in response to an input force to supply a remotely located brake booster with operational pressurized fluid which moves a piston arrangement within master cylinder and thereafter develop operational pressurized fluid to effect a brake application.

DETAILED DESCRIPTION

Figure 1:
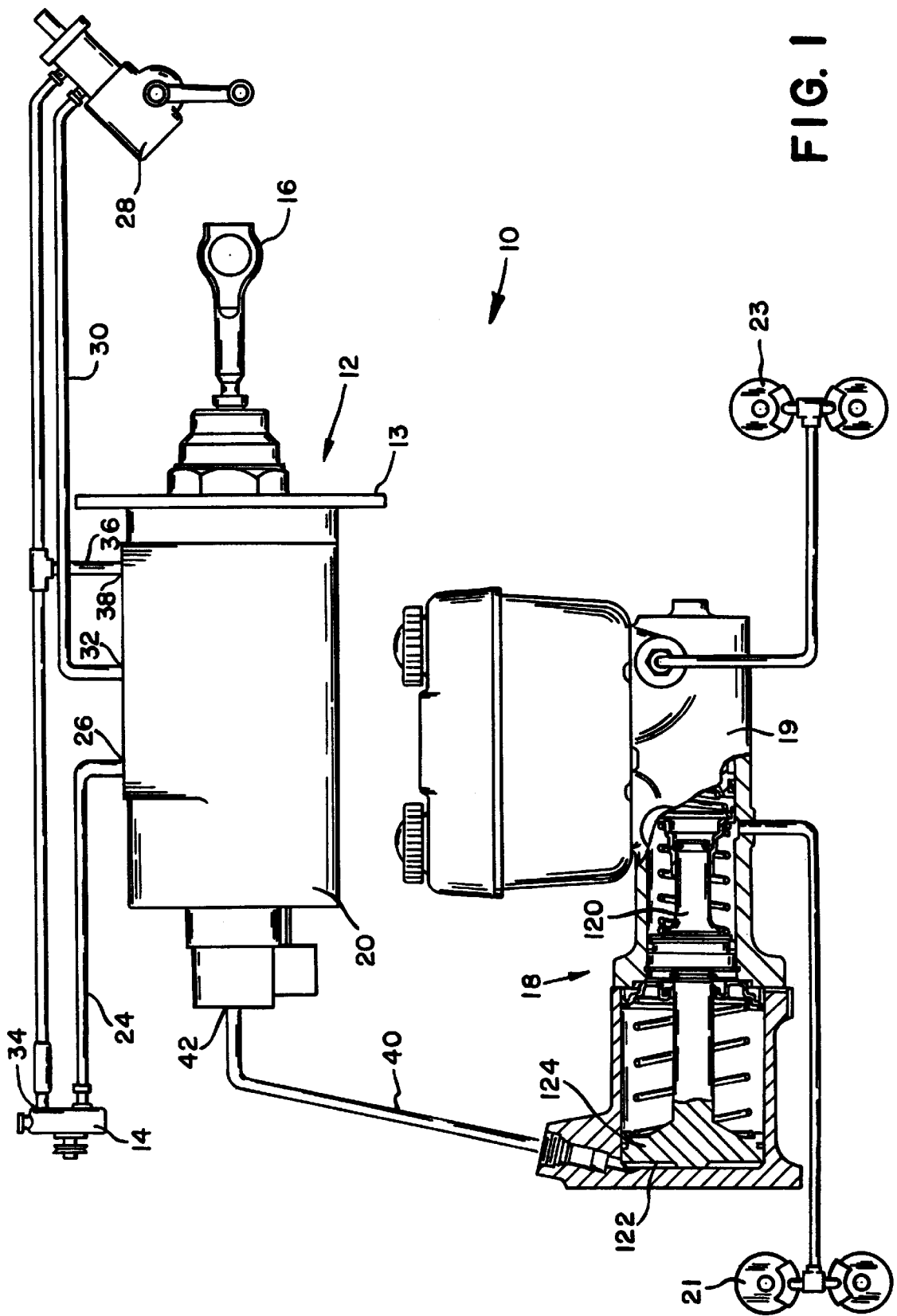
FIG. 1 is a schematic illustration of a brake system which includes a control apparatus made according to the principals of the present invention.

The brake system 10 shown in FIG. 1 includes a control apparatus 12 which is mounted on the fire wall 13 of a vehicle. The control apparatus 12 receives pressurized fluid from pump 14 in the steering system and in response to an input force supplied by an operator through a pedal rod 16 communicates an operational signal to a remotely located brake booster 18 to develop an actuation force to effect a brake application.

Figure 2:
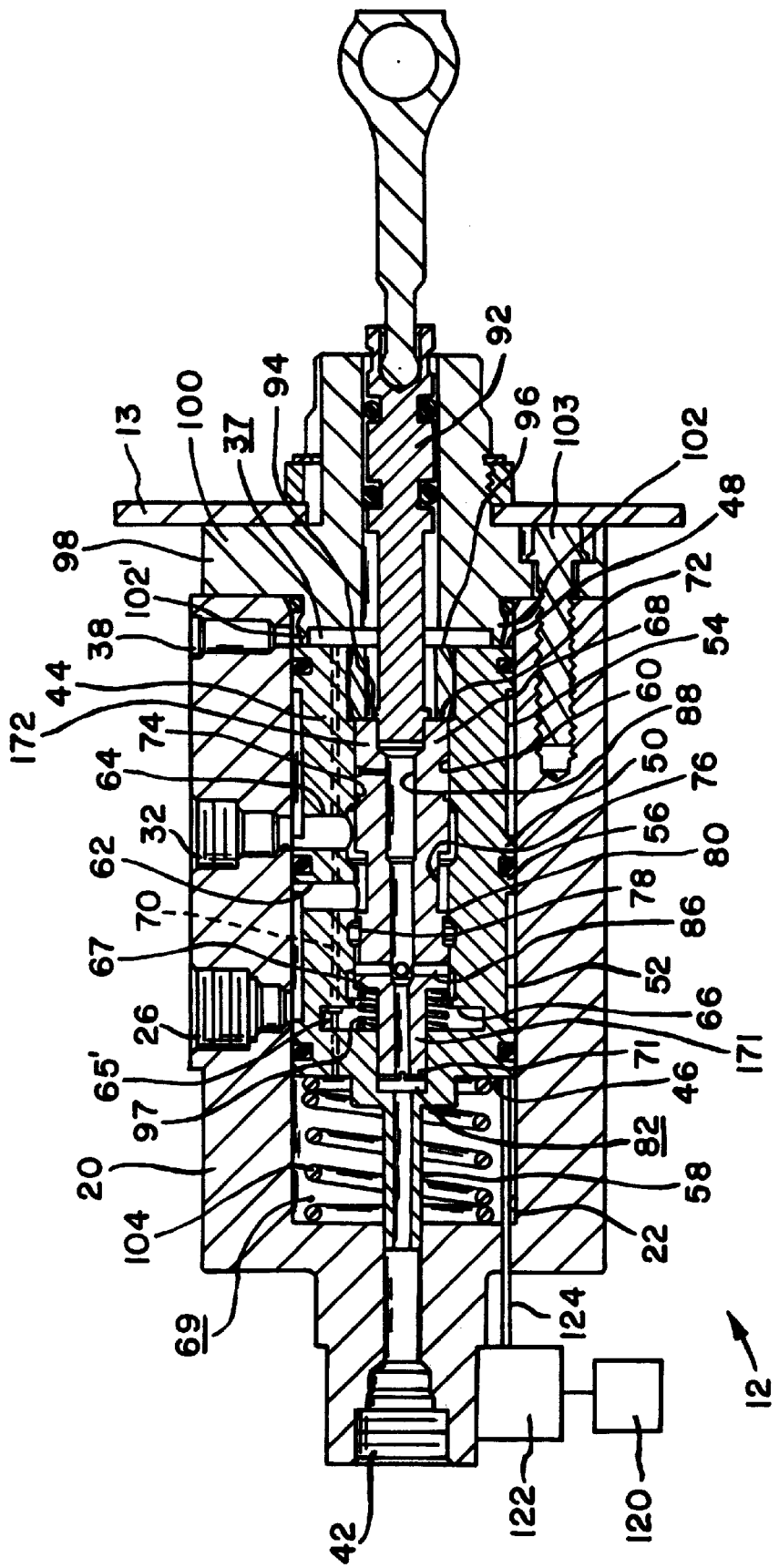
FIG. 2 sectional view of the control apparatus of FIG. 1 shown in the rest position.
Figure 3:
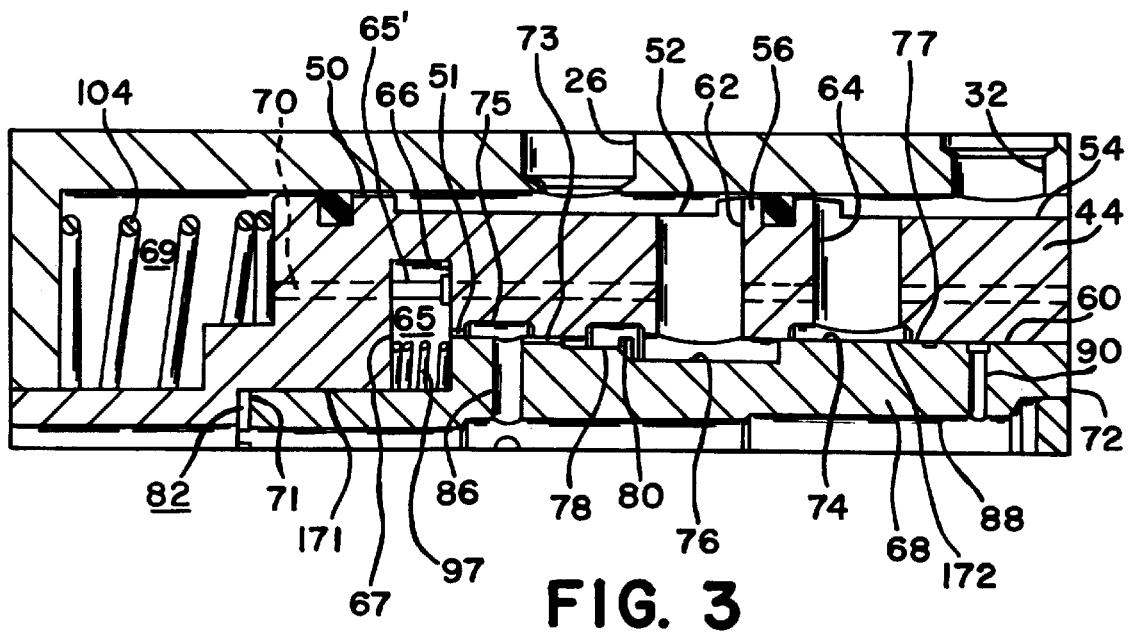
FIG. 3 is a partial sectional view of the control apparatus of FIG. 2 in a actuation position.

The control apparatus 12 included in FIG. 1 is further illustrated in FIGS. 2 and 3, and includes a housing 20 with a first bore 22 therein. The first bore 22 is in communication with pump 14 by conduit 24 connected to inlet port 26, with the steering gear 28 (hydraulically operated device) by conduit 30 connected to gear port 32, with a reservoir 34 in pump 14 by a conduit 36 connected to relief port 38 and with brake booster 18 by a conduit 40 connected to an outlet port 42. A piston 44 which is located in the first bore 22 has a cylindrical body with a first end 46 and a second end 48. The cylindrical body of piston 44 has a first peripheral surface 50 with first 52 and second 54 grooves thereon separated by a land 56 and a projection 58 which extends from the first end 46. Projection 58 sealingly engages housing 20 and extends into outlet port 42 such that a second stepped bore 60 therein effectively extends from the second end 48 of piston 44 though projection 58 and into outlet port 42. On insertion of piston 44 into bore 22, a first or dampening chamber 69 is formed adjacent the first end 46. A passageway 70 in piston 44 extends from the first end 46 to the second end 48 for connecting the first or dampening chamber 69 with a relief chamber 37 located adjacent relief port 38. Stepped bore 60 is connected to the first 52 and second 54 grooves by first 62 and second 64 radial passages and to passageway 70 by a slot 51 that extends into a cylindrical undercut 66 in the cylindrical body. A spool 68 which is located in bore 60 has a first end 71 with a first diameter 171 and a second end 72 with a second diameter 172. The first diameter extends from the first end 71 to a shoulder 67 on the second diameter 172 that thereafter extends to the second end 72. The second diameter 172 of spool 68 has a peripheral surface 74 with a control groove 76 separated from a relief groove 78 by a land 80 and a slot 73 which connects relief groove 78 with a supply groove 75 located in the cylindrical body of piston 44. The first diameter section of spool 68 defines a projection that extends from shoulder 67 of the second diameter 172 and sealingly engages bore 60 to define a reaction chamber 82 adjacent the first end 71 while the second diameter 171 of spool 68 engages bore 60 to define with undercut 66 an internal relief chamber 65. Internal relief chamber 65 is connected to relief chamber 37 by passageway 65' that is connected to passageway 70. A cross bore 86 connects the peripheral surface 74 with a central bore 88 formed in spool 68. A third radial passage 90 in spool connects the central bore 88 with a slot 77 formed on the peripheral surface 74. A snap ring 96 retained in piston 44 forms a stop against which spring 97 positions spool 68 within bore 60 to align the first 62 and second 64 radial passages with control groove 76 to provide for unrestricted communication of pressurized fluid between inlet port 26 and gear port 32 when the control apparatus 12 is in the rest condition as illustrated in FIG. 2.

An input rod 92 has a first end which is sealingly extends into bore 88 until shoulder 94 engages end 72 of spool 68. A flat plate 100 which is connected by fasteners 103 (only one of which is shown) to housing 20 positions an end cap 98 on housing 20 for retaining piston 44 within bore 22. End cap 98 has a plurality of projections 102,102' which extends into bore 22 and engages end 48 of piston 44 to define relief chamber 37. A return spring 104 located in the first or dampening chamber 69 acts on end 46 to urge end 48 into engagement with the plurality of projections 102,102' to align the first 62 and second 64 radial passages on piston 44 in a desired location with inlet port 26 and gear port 32. The projections 102,102' form a stop to assure that end 48 do not engage the end cap 98 in a manner which would restrict flow from relief chamber 37 to relief port 38. With the relief chamber 37 being located adjacent end cap 98, the pressure level of the fluid therein is relatively low and thus the possibility of the loss of pressurized fluid from bore 22 is reduced.

Figure 4:
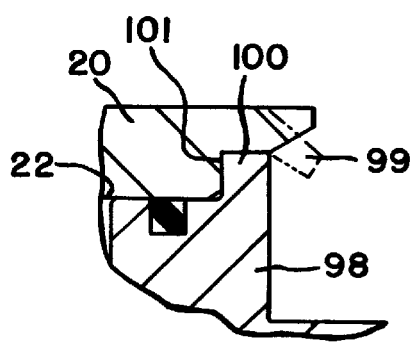
FIG. 4 is a partial sectional view of alternate structure for retaining a control apparatus in a housing.

For some applications, the cylindrical body of end cap 98 may be attached to the housing 20 by a series of tabs 99 (only one being shown) which engage and position end cap 98 on shoulder 101 adjacent first bore 22 as shown in FIG. 4. This type of attachment of the end cap 98 could simplify and reduce parts in the control apparatus 12.

MODE OF OPERATION OF THE INVENTION

With spool 68 in the rest position as shown in FIG. 2, pressurized fluid is freely communicated from pump 14 and available for the operation of the steering gear 28 (hydraulically operated device) by way of inlet port 26, first groove 52, first radial passage 62, control groove 76, second radial passage 64 and gear port 32.

The operation of the steering gear 28 is independent from the control apparatus 12, however, during a partial brake application should the resistance to operation of the steering gear 28 momentarily cause the fluid pressure as present in the gear port 32 to increase, a pressure differential could be created across land 56. If such pressure differential is sufficient to overcome return spring 104, piston 44 moves away from stop or the plurality of projection 102,102' on end cap 98 and a flow path is created to relief chamber 37 by way of passage 65', internal relief chamber 65, slot 51, relief groove 78 and control groove 76 to dissipate the increase in fluid pressure to reservoir 34 in pump 14. When the increase in fluid pressure has been reduced to the fluid pressure of the pump 14, return spring 104 repositions piston 44 to the rest position illustrated in FIG. 2.

When an operator desires to effect a brake application, an input force is applied to pedal rod 16 which moves input rod 92 causing spool 68 to move within bore 60 and restrict communication between the first 62 and second 64 radial passages while diverting pressurized fluid to the outlet port 42 by way of cross bore 86, relief groove 78 and control bore 76. Fluid pressure as supplied to outlet port 42 flows in conduit 40 to a chamber 122 of brake booster 18. The fluid pressure in chamber 122 acts on piston 124 to develop an actuation force which moves the piston arrangement 120 in master cylinder 19 to correspondingly develop pressurize fluid which is supplied to the wheel brakes 21,23 of the vehicle to effect a brake application per the input force.

The wheel brakes of the vehicle on being presented with pressurized fluid developed in master cylinder 19 as a result of movement by piston 124 of the brake booster 18 offers resistance to establish a reaction pressure. The reaction pressure is communicated back to reaction chamber 82 and acts on the first end 71 of spool 68 to develop a reaction force. The reaction force is correspondingly communicated to input rod 92 by way of shoulder 94 to oppose the input force applied by the operator and provide an indication of the fluid pressure being supplied to effect the brake application. It should also be understood that the reaction pressure present in chamber 82 acts on piston 44 and if sufficient to overcome return spring 104 will move piston 44 such that the relationship of the radial passages 62 and 64 and control groove 76 remain constant to assure that the desired braking force is maintained to effect the brake application. Also, reaction pressure is present in bore 88 and communicated to radial bore 90 and slot 77 for presentation to gear port 32 such that only a limited amount of fluid is actually diverted from the quantity of fluid available for the operation of the steering gear 28.

For some applications, it may be desirable to provide a controller 120 in the vehicle with an indication of the braking of the wheel brakes. A sensor 122 attached to housing 20 has a probe 124 which extends into chamber 69 and engages piston 44. Movement of piston 44 is communicated to controller 120 to provide an indication of the intensity of the fluid pressure being supplied to effect a brake application.

We claim:

1. A control apparatus for a brake system, said control apparatus having a housing with a first bore therein, said first bore being connected with a source of fluid under pressure through an inlet port, a hydraulically operated device through a gear port, a reservoir through a relief port and a brake booster through an outlet port, piston means located in said first bore, said piston means having a first peripheral surface with first and second grooves separated by lands and a second bore, said second bore being connected to said first and second grooves by first and second radial passages, spool means having a second peripheral surface with a control groove thereon located in said second bore and a third bore, said control groove being connected to said third bore by a third radial passage and to said relief port, an input rod located in said third bore, cap means secured to said housing for retaining said piston means in said housing, and resilient means for positioning said piston means within said first bore and said spool means within said second bore whereby pressurized fluid is communicated to said hydraulically operated device by way of said inlet port, first groove, first radial passage, control groove, second radial passage and gear port, said input rod responding to an input force by moving said spool means within said second bore to restrict communication between said first and second radial passages while diverting pressurized fluid to said third bore by way of said third passage, said piston means being characterized by a first projection that extends in sealing engagement with said housing for connecting said third bore with said outlet port to supply said brake booster with pressurized fluid for effecting a brake application.

2. The control apparatus as recited in claim 1 wherein said spool means is characterized by a second projection which engages said piston means to define a reaction chamber and a relief chamber within said second bore, said brake booster on being presented with pressurized fluid offering resistance to establish a reaction pressure, said reaction pressure being presented to said reaction chamber and acting on said second projection to create a reaction force which opposes said input force to provided an operator with an indication of the braking force.

3. The control apparatus as recited in claim 2 wherein said reaction force acts on and moves said piston means within said first bore.

4. The control apparatus as recited in claim 3 wherein said piston means is further characterized by a first passageway which connects a first chamber defined in said first bore by said piston means and said housing with said relief port, said first passageway allowing fluid in said first chamber to flow to said relief port to control the movement of said piston means by said pressurized fluid.

5. The control apparatus as recited in claim 4 wherein said piston means is further characterized by a second passageway for connecting said relief chamber with said relief port.

6. The control apparatus as recited in claim 5 wherein said cap means is characterized by a cylindrical section which extends into said first bore and flat plate, said flat plate being fixed by a plurality of fasteners to said housing to position said cylindrical section with said first bore and define a stop for said piston means such that said first and second radial passages are aligned with said inlet port and said gear port.

7. The control apparatus as recited in claim 6 further characterized by sensor means responsive to movement of said piston means to provide a controller with an indication of the intensity of the pressurized fluid being communicated to said brake booster.

8. The control apparatus as recited in claim 5 wherein said cap means is characterized by a cylindrical member which is retained on a shoulder adjacent said first bore by a plurality of tabs that extend from said housing.

9. The control apparatus as recited in claim 1 further characterized in that said relief port is located adjacent said cap means to reduce the possibility of the loss of pressurized fluid from said first bore.

10. The control apparatus as recited in claim 2 is further characterized by stop means secured to said piston means for retaining said spool means within said second bore such that said control groove is located in a desired alignment with said first and second radial passages.

11. The control apparatus as recited in claim 2 wherein said piston means moves within said first bore in response to a resistive force developed in said hydraulically operated device to open communication between said gear port and said relief port to dissipate the increase in fluid pressure to a level corresponding to the fluid pressure of said source of fluid pressure.

* * * * *